United States Patent
Grabs et al.

(10) Patent No.: US 7,873,627 B2
(45) Date of Patent: Jan. 18, 2011

(54) RELATIONAL DATABASE SCALAR SUBQUERY OPTIMIZATION

(75) Inventors: Torsten Walther Grabs, Bellevue, WA (US); Adrian Sorin Baras, Redmond, WA (US); Cesar A. Galindo-Legaria, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 11/334,655

(22) Filed: Jan. 18, 2006

(65) Prior Publication Data

US 2007/0168324 A1    Jul. 19, 2007

(51) Int. Cl.
*G06F 17/30* (2006.01)
(52) U.S. Cl. ..................................... 707/713
(58) Field of Classification Search .................. 707/713
See application file for complete search history.

(56) References Cited

U.S. PATENT DOCUMENTS

| | | | |
|---|---|---|---|
| 5,615,361 A * | 3/1997 | Leung et al. .................... 707/3 |
| 6,085,223 A | 7/2000 | Cariño, Jr. et al. |
| 6,088,524 A * | 7/2000 | Levy et al. ................... 707/713 |
| 6,092,062 A * | 7/2000 | Lohman et al. ................. 707/2 |
| 6,529,896 B1 * | 3/2003 | Leung et al. .................... 707/2 |
| 6,581,055 B1 | 6/2003 | Ziauddin et al. |
| 6,654,734 B1 | 11/2003 | Mani et al. |
| 6,826,562 B1 * | 11/2004 | Leung et al. .................... 707/4 |
| 7,120,645 B2 * | 10/2006 | Manikutty et al. .......... 707/102 |
| 7,251,646 B1 * | 7/2007 | Shriraghav et al. ............. 707/2 |
| 7,529,728 B2 * | 5/2009 | Weissman et al. .............. 707/2 |
| 7,577,647 B2 * | 8/2009 | Graefe et al. ..................... 1/1 |
| 2002/0143754 A1 * | 10/2002 | Paulley et al. .................. 707/3 |
| 2003/0167258 A1 | 9/2003 | Koo et al. |
| 2005/0004892 A1 | 1/2005 | Brundage et al. |
| 2005/0050041 A1 | 3/2005 | Galindo-Legaria et al. |
| 2005/0097099 A1 | 5/2005 | Kapoor et al. |
| 2005/0210002 A1 | 9/2005 | Pal et al. |
| 2005/0228772 A1 | 10/2005 | Faunce et al. |
| 2007/0124276 A1 * | 5/2007 | Weissman et al. .............. 707/2 |

FOREIGN PATENT DOCUMENTS

WO    WO 2005/001623 A2    1/2005

OTHER PUBLICATIONS

Obasanjo, D., "An Exploration of XML in Database Management Systems", 2001, http://www.25hoursaday.com/StoringAndQueryingXML.html, 9 pages.

(Continued)

*Primary Examiner*—Charles Rones
*Assistant Examiner*—Mellissa M Chojnacki
(74) *Attorney, Agent, or Firm*—Woodcock Washburn LLP

(57) ABSTRACT

When two or more scalar subtrees in an execution plan are directed towards the same data set, but request different data from the data set, the two subtrees are replaced in the execution plan with a new subtree which queries the data set only once. This new query to the data set covers all data required by the different subtrees. A pivoting step then is used to separate the data which would have been sought by each subtree. The pivoting step also yields data in the same form as would have resulted from the original subtrees.

20 Claims, 10 Drawing Sheets

OTHER PUBLICATIONS

Pal et al., "XQuery Implementation in a Relational Database System", Proceedings of the 31$^{st}$ VLDB Conference, Trondheim, Norway, Aug. 30-Sep. 2, 2005, 1175-1186.

Pal et al., "Indexing XML Data Stored in a Relational Database", Proceedings of the 30$^{th}$ VLDB Conference, Toronto, Canada, Aug. 29-Sep. 3, 2004, 1146-1149.

Rathod, B., "Query Processing for XML Data Stored in a Relational Database", Jun. 27, 2004, 1-12.

Tatarinov et al., "Storing and Querying Ordred XML Using a Relational Database System", Proceedings of the 2002 ACM SIGMOD International Conference on Management of Data, Madison, Wisconsin, Jun. 3-6, 2002, 12 pages.

Wu et al., "Structural Join Order Selection for XML Query Optimization", Proceedings of the 19th International Conference on Data Engineering (ICDE), Bangalore, India, Mar. 5-8, 2003, 12 pages.

* cited by examiner

RELATIONAL DATABASE SCALAR SUBQUERY OPTIMIZATION

BACKGROUND

In conventional databases, an incoming query is typically received and manipulated by a database front end prior to being submitted to a query processor for optimization and execution. Generally, the database front end uses the incoming query to generate a query plan for executing the query at the query processor. The query plan is then used to generate an execution plan which is used to execute the incoming query.

Some relational databases generate an execution plan as follows. First, the query is parsed to yield an abstract syntax tree. The abstract syntax tree is then transformed into a unified tree structure in which nodes represent abstract operations to be performed on the query. An algebrizer is then employed to convert the unified tree operations into relational algebraic expressions in a logical operator (log-op) tree. The log-op tree represents the resulting query plan. Query optimization is used to optimize the performance of the query plan, which is then ready for execution.

A recent development with respect to databases is that, in addition to supporting traditional relational data, the databases also support extensible markup language (XML) data. For example, SQL Server™ from Microsoft Corp. of Redmond, Wash. enables data to be defined using an XML data type. Columns with such an XML data type can be created in a data table, and XML variables and parameters can be declared. Such XML data can be searched, retrieved, and updated. Specifically, a query may include an XML expression written in an XML based query language such as XQuery and XSLT.

While relational database systems can include functionality to store XML data, a limitation of conventional databases is in the retrieval of the XML data. The plans derived from XML-related queries tend to be complex even for simple tasks, such as retrieving several scalar values from a set of XML documents. For example, consider a set of XML documents containing information regarding a number of persons, with two name elements for each person, "firstname" and "lastname." A plan derived from a query requesting that the firstname and lastname be retrieved for each person in the XML documents would require each XML document to be accessed twice, once to retrieve the firstname for each person, and once to retrieve the lastname. This redundant opening is costly if performed for many scalar values on many XML documents. The work to process an XML-query grows in proportion to the number of scalar values to be retrieved and in proportion to the number of XML documents to be accessed by the query.

Thus, there is a need in the art for systems and methods for more efficiently processing relational database queries which access XML data.

SUMMARY

The present invention is directed to systems and methods for more efficiently processing relational database queries which access extensible markup language (XML) data. According to some embodiments of the invention, a query plan generated for a query including an XML expression is examined in order to identify work common among a set of subqueries. A substitute subquery is crafted as a replacement. Additional relational query plan operators are crafted into the substitute subquery to implement the residual work that differentiates the original subqueries.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Query Processing Environment

Figure 1:
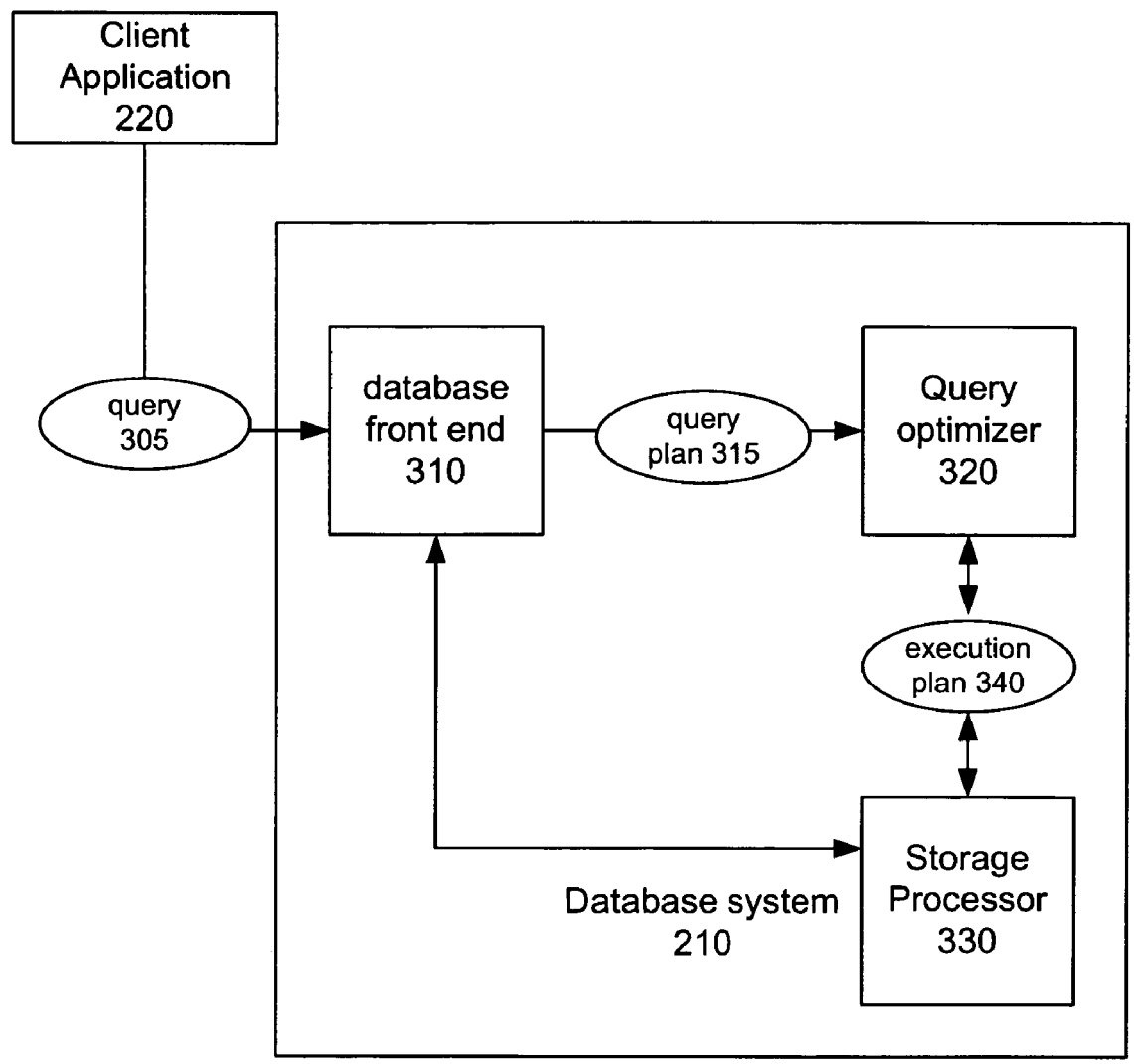
FIG. 1 is a block diagram of an exemplary query processing environment according to some embodiments of the invention.

An exemplary query processing environment according to the invention is shown in FIG. 1. Generally, client application 220 submits a query 305 to database system 210. The query is then processed at database system 210, and results are returned to client application 220.

Database system 210 includes database front end 310, query processor 320, and storage processor 330. The database front end 310 receives query 305 from client application 220 and validates query 305. For example, database front end 310 may validate that a table referenced by query 305 is a valid table that is present in the database(s) accessed by database system 210. Database front end 310 may also verify that query 305 has been submitted by an authorized user. Database front end 310 also generates a query plan 315 representing query 305. According to the invention, XML-query-optimizing database front end 310 performs query plan generation in an optimized manner for certain queries involving XML data, as will be discussed below.

Query optimizer 320 receives query plan 315 and generates an execution plan 340 based on query plan 315. According to some embodiments of the invention, query optimizer 320 performs query plan generation in an optimized manner for certain queries involving XML data, as will be discussed below.

Storage processor 330 maintains data in a storage medium. Storage processor 330 also maintains a database schema. Essentially, then, storage processor 330 contains the functionality to access the stored data of database system 210 based on a received execution plan from query optimizer 320.

Figure 2:
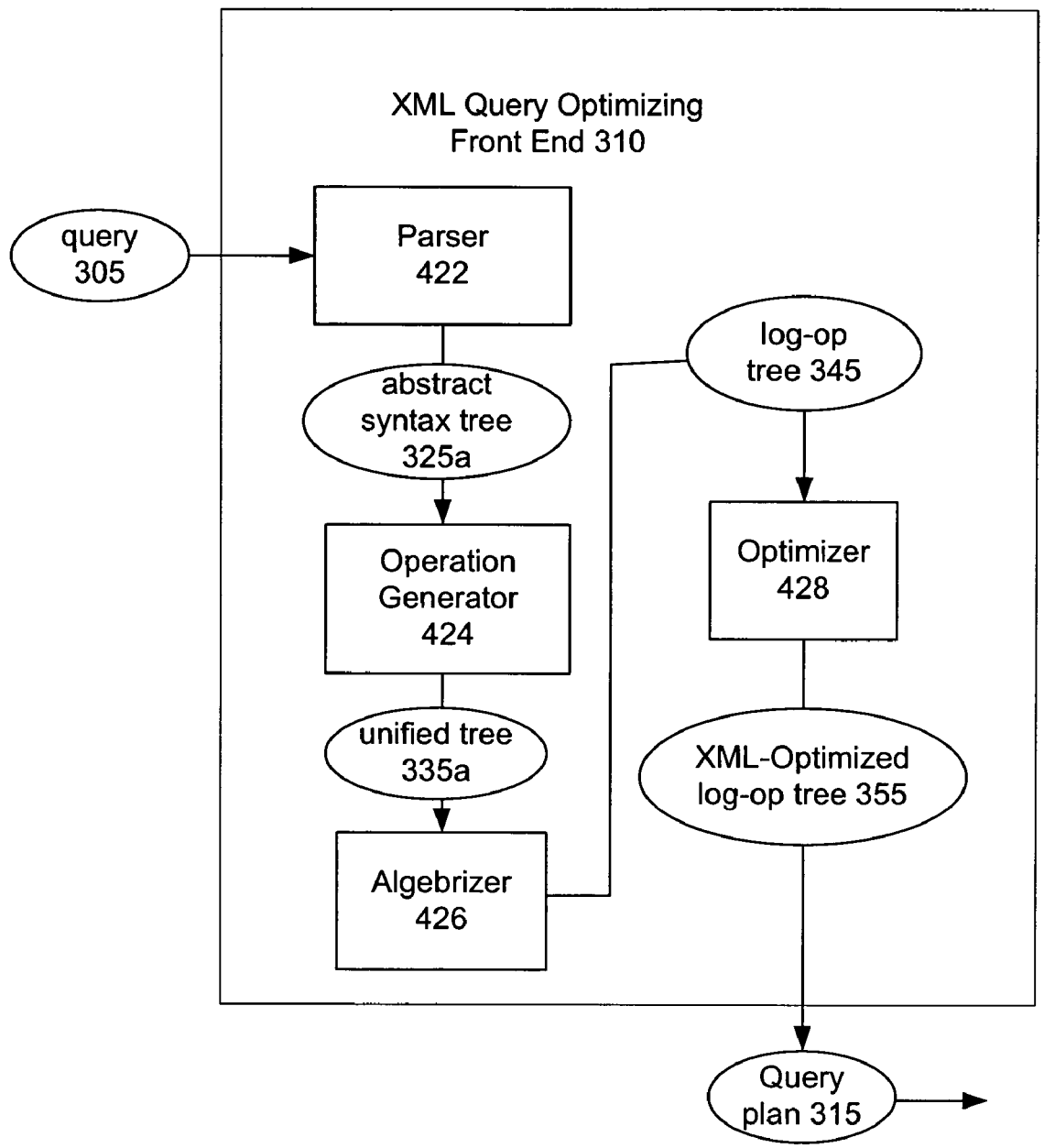
FIG. 2 is a block diagram of an exemplary database front end according to some embodiments of the invention.

An exemplary database front end 310 and query optimizer 320 is shown in FIG. 2. Generally, database front end 310 receives query 305 and generates a corresponding query plan 315, which is submitted to query optimizer 320 for optimization and execution plan 340 generation. Parser 422 parses query 305 to yield an abstract syntax tree 325a. Operation generator 424 than transforms the abstract syntax tree 325a into a unified tree structure 335a. The nodes of unified tree structure 335a represent abstract operations to be performed for query 305. Algebrizer 426 converts the relational operations in the unified tree 335a to algebraic expressions in a log-op tree 345. An XML-specific optimization component 428 of the query optimizer takes the log-op tree 345 and optimizes XML-related subqueries as discussed below, producing XML-optimized log-op tree 355. Based on the XML-optimized log-op tree 355. Using the query plan 315 generated by the database front end, the query optimizer 320 generates the resulting execution plan 340, which is submitted to storage processor 330.

While the optimizer 428 is shown as separate from the other elements of the database, it should be appreciated that the optimizer 428 or optimizing functionality may be incorporated into other elements of the database system and may be included elsewhere in the data flow leading to the XML-optimized log-op tree.

In some front ends for database systems, the parser, operation generator and algebrizer shown in FIG. 2 exist in parallel, with a relational parser, a relational operation generator, and a relational algebrizer used to produce a query plan portions related to the non-XML portions of queries, and an XML parser, XML operation generator, and XML algebrizer used to produce query plan portions related to XML-related portions of queries. The log-op tree 345 is then produced from the outputs of both the relational algebrizer and the XML algebrizer.

Relational Database Query Optimization For Extensible Markup Language Data

Figure 3:
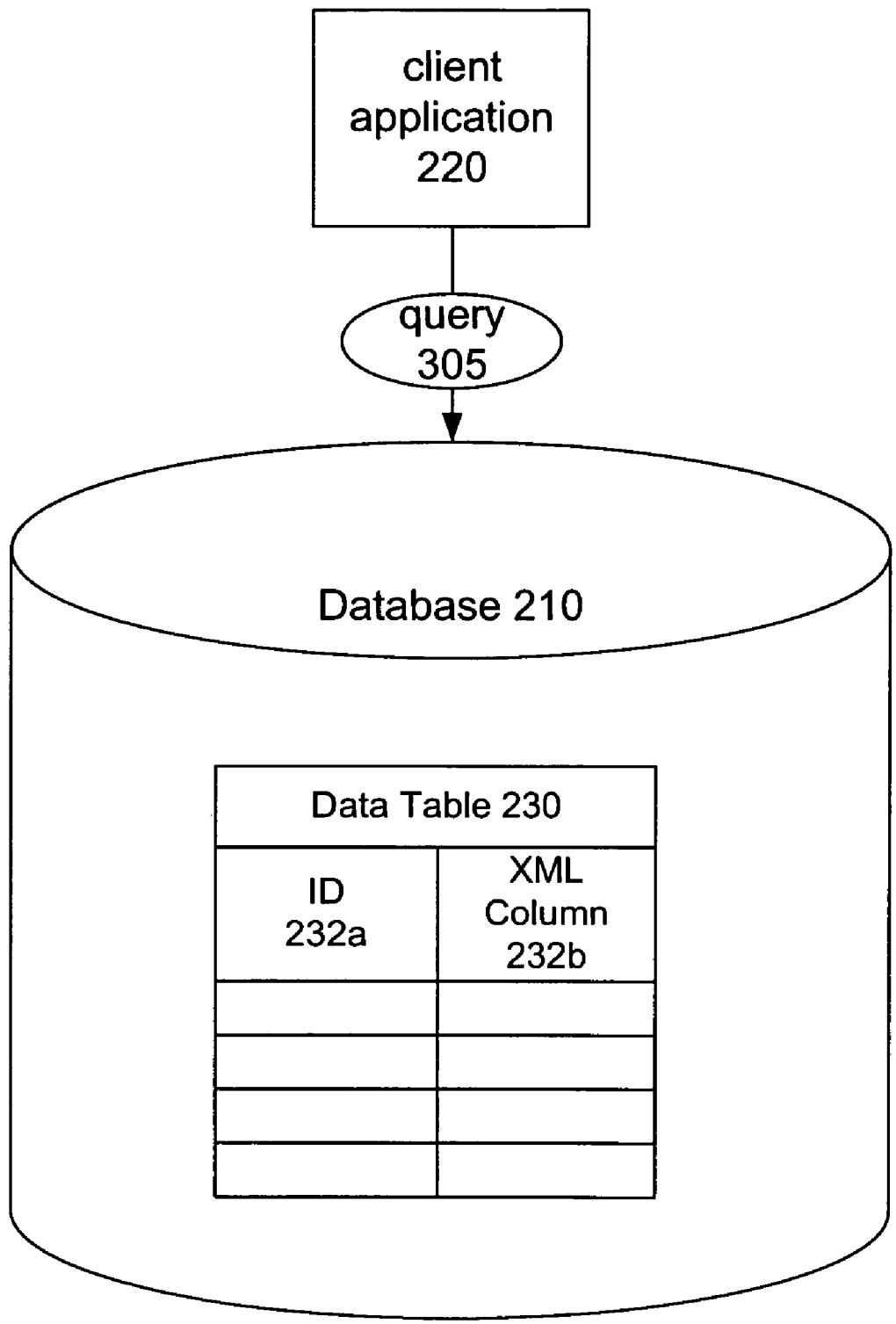
FIG. 3 is a block diagram of an exemplary database system in accordance with the present invention.

As set forth above, the present invention is directed to systems and methods for more efficiently processing relational database queries including scalar subqueries. As shown in FIG. 3, the present invention in some embodiments is implemented in a database that enables data to be defined using an XML data type, such as database system 210 of FIG. 3. Database system 210 includes a data table 230 with columns 232a and 232b. Column 232a is a relational column that is the primary key column of table 230 including a unique identifier for each instance of column 232b. As should be appreciated, table 230 may include other relational columns (not shown) in addition to column 232a. Column 232b is an XML column that includes XML data organized in a hierarchical manner which may include elements, attributes, and text. Table 230 may also include additional XML columns (not shown).

Figure 4:
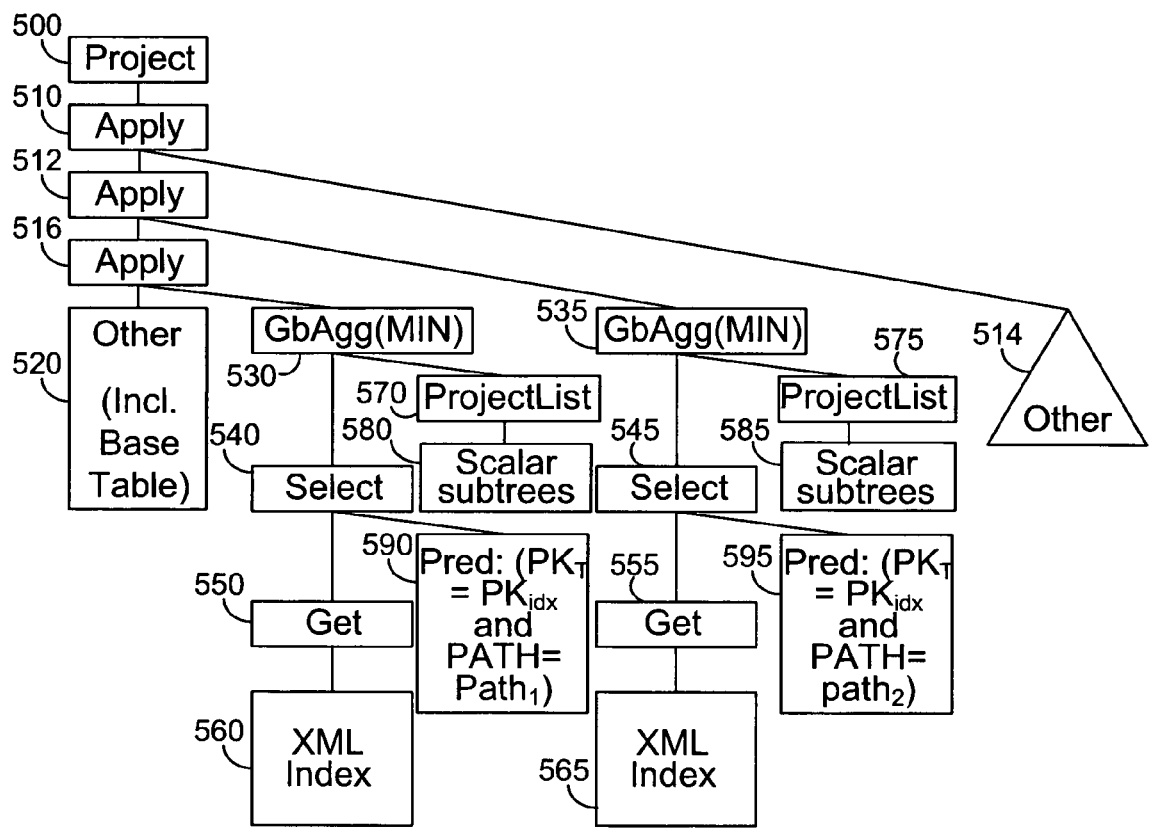
FIG. 4 is a block diagram of a query tree.

In order to retrieve XML data from database system 210, a query 305 referencing the data is submitted. For example, where XML column 232b data stores "person" data including a firstname and a lastname, the query 305 may be the following relational database query:

SELECT xmlcol.value('/person/firstname','nvarchar (200)'), xmlcol.value('/person/lastname',"nvarchar(200)') FROM persons This query requests that both firstname data and lastname data be retrieved from the persons data stored in XML data. With reference again to FIG. 2, the log-op tree 345 produced may appear as shown in FIG. 4. FIG. 4 is a block diagram of a query tree for a query such as the one above.

As shown in FIG. 4, the root node of the query tree, project 500, represents the entire query. This query includes the application, at apply node 510, of the result of apply node 512 with other parts of the query tree, represented by the "other" subtree 514. Apply node 512 applies the result of apply node 516 with the result of GbAgg(MIN) node 535. Apply node 516 applies other results generated by the query tree below represented by the "other" node 520, which includes the base table which is being acted upon to the result of GbAgg(MIN) node 530. Each apply node, 510, 512, and 516 adds one or several values (columns) to the row of the result. Thus, for example, if a lastname is retrieved for each specific keyed record in GbAgg(MIN) node 530, then the lastname value is added in a new column for each row of the result of "other" node 520. If a firstname value is retrieved for each specific keyed record in GbAgg(MIN) node 535, then in apply node 512, a new column containing the firstname for each row is added to the result from apply node 516.

GbAgg(MIN) node 530 and GbAgg(MIN) node 535 are both the top nodes of subtrees in the query tree. Each of these subtrees implements a scalar subquery which retrieves a scalar XML data value. GbAgg(MIN) node 530 and GbAgg (MIN) node 535 represent grouping operator GbAgg which are used to enforce that the subquery returns only a single scalar value. The project lists 570 and 575 and scalar subtrees 580 and 585 aid in further processing such as data type conversions of the scalar value retrieved by the subquery. The data is received from select nodes 540 and 545, which include a get instruction 550 and 555 on the XML index 560 and XML index 565 respectively. The select node 540 selects data based on the predicate 590, and select node 545 selects data based on the predicate 595. The predicate 590 selects records from the XML Index based finding the record (finding the record from XML index 560 with the correct PK—where the $PK_T$ of the record from the XML Index 560 is equal to $PK_{idx}$) and finding the correct data in that record (for which the PATH=$path_1$).

Thus, for example, in the example SELECT statement above, the path for predicate 590 would be "/person/firstname" and the path for predicate 595 would be "/person/lastname". The identical base table, in the example SELECT would be used in both node 560 and 565.

Because the SELECT nodes 540 and 545 gather scalar data—values in non-tabular form—these are considered scalar subtrees. Generally, scalar subtrees are subtrees which gather scalar data, for example, from XML documents or other non-tabular data sources. Scalar data comprises only a single data value such as a single number. This is in contrast to vector or tabular data that consists of several data values. Therefore, a scalar subquery (or its corresponding scalar subtree in the query plan) is a subquery used to retrieve only a single data value from the database. Scalar subqueries can be applied to any data source including tabular ones: however, it is important that the query plan makes sure that only a scalar is returned. We enforce this property by adding the GbAggs to the query plan as discussed above.

Optimization

Figure 5:
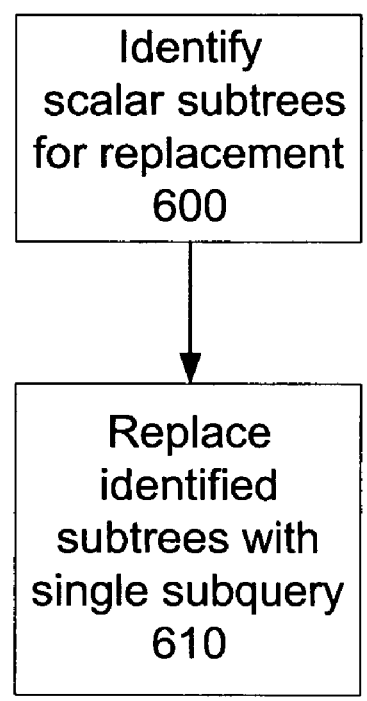
FIG. 5 is a flow diagram illustrating a method for optimizing a query tree according to some embodiments of the invention.

As shown in FIG. 2, once the log-op tree 345 is produced, an optimizer 428 can be used to optimize the log-op tree. FIG. 5 is a flow diagram illustrating a method for optimizing a query tree according to one embodiment of the invention. As shown in FIG. 5, the method includes step 600 of identifying two or more scalar subqueries directed towards the same data source. Thus, in the log-op tree shown in FIG. 4, the subtree with its root at GbAgg node 530 is one scalar subtree, and the subtree with its root at GbAgg node 535 is another scalar subtree. If both of these subtrees are directed towards the same data source, such as XML Column 232b in data table 230 from FIG. 3, then in step 600 these are identified as two scalar subqueries directed towards the same data source.

In step 610, the identified subqueries are replaced with a single subquery that contains a single query of the data source for all data required for all identified subqueries. This is done by using a predicate disjunction. For example, where previously the predicate in the select statement of a first subquery was:

$PK_T = PK_{idx}$ and PATH=path$_1$ and the predicate of a second subquery was:

$PK_T = PK_{idx}$ and PATH=path$_2$ then the predicate of the replacement subquery would include the disjunction of these two predicates, as follows:

($PK_T = PK_{idx}$ and PATH=path$_1$) and ($PK_T = PK_{idx}$ and PATH=path$_2$)

or other logical which is logically equivalent to:

$PK_T = PK_{idx}$ and (PATH=path$_1$ or PATH=path$_2$).

Pivoting functionality is also used in order to process and distribute data differently depending on what original subquery the row was targeted for. Each original subquery would have produced data as a new column added to each row, with the column containing the specified information. However a query with the predicate of the replacement subquery will not provide data separated out per-subquery and added as a new column in this fashion. Thus, the pivoting functionality allows the separation of the results as per the replaced subqueries.

For example, the select statement with the disjunctive predicate shown above would produce tabular data comprising rows as shown in Table 1:

TABLE 1

Tabular Result of Select Statement

| 00001 | "Albert"    | path$_1$ |
| 00001 | "Einstein"  | path$_2$ |

This shows that for an object in the data with an object identifier (OID) 00001, the path$_1$ property value is "Albert" and the path$_2$ property value is "Einstein". Thus the result from the first subquery is in a first row and the result from the second subquery is in a second row. However, the original subqueries generally add data in separate columns, each property in a new column (rather than a new row) and so the pivoting step resulting from the pivoting functionality results in second tabular data, with one column containing results from the first original subtree and a second column containing results from the second original subtree.

For example, the pivoting statement after projecting out the ID column would produce tabular data comprising rows as shown in Table 2:

TABLE 2

Tabular Result of Pivoting Statement

| path$_1$    | path$_2$ |
|-------------|----------|
| "Einstein"  | "Albert" |

Figure 6:
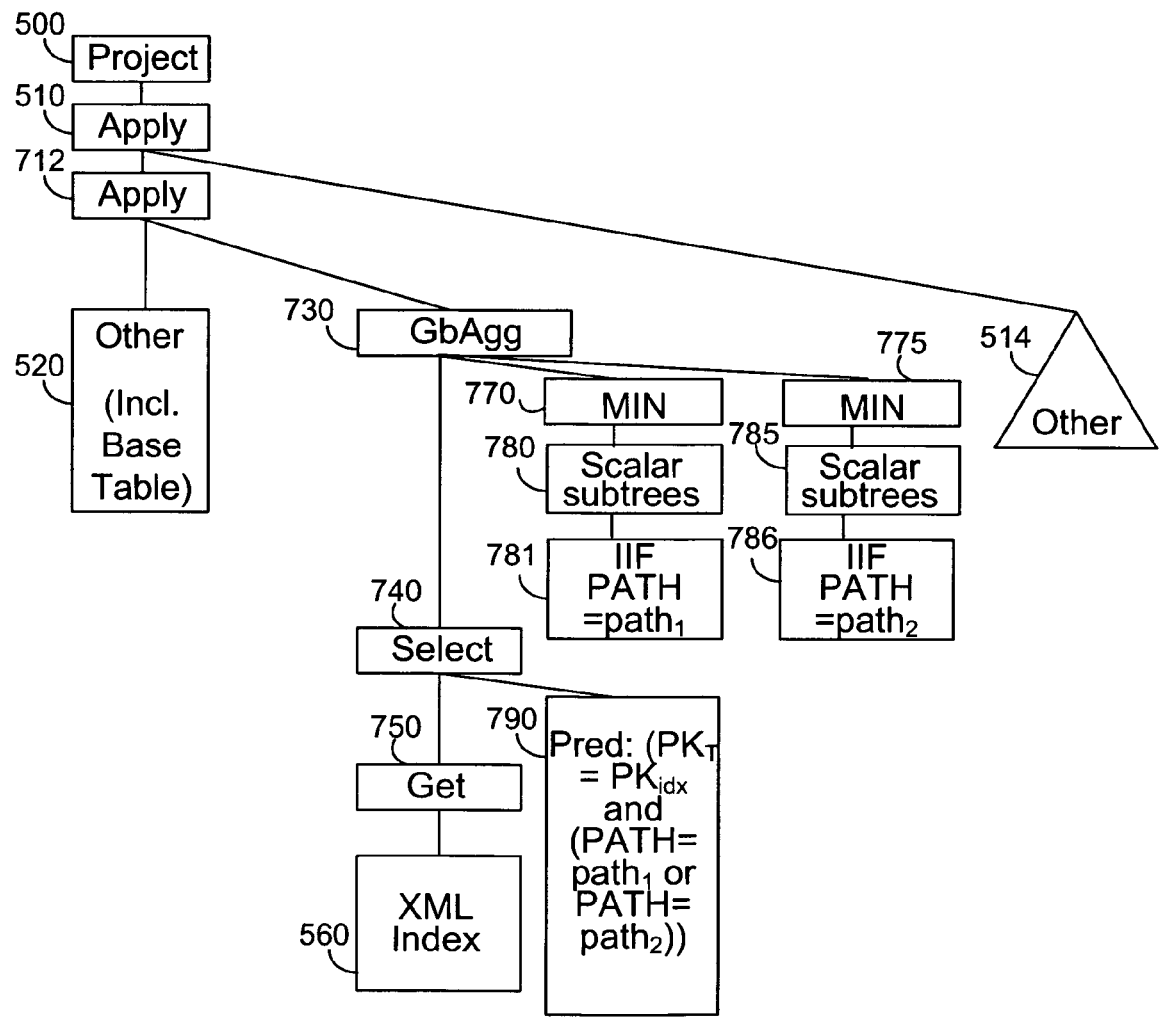
FIG. 6 is a block diagram of the query tree after optimization according to some embodiments of the invention.

FIG. 6 is a block diagram of the query tree of FIG. 4 after such optimization. As shown in FIG. 6, project node 500, apply node 510 and "other" subtree 514 are the same, as is "other" node 520. However, the subtrees with root nodes at nodes 530 and 535 have been replaced by the subtree with root node 730. In this replacement subtree, select node 740 implements a select operation using Get node 750 on the same XML Index 560 that was selected from by both subtrees previously. The predicate 790 of the select statement is the disjunction of the two predicates from the replaced subtrees. More than two subtrees may be replaced in this manner, and the disjunction of all predicates would be used in as the new predicate.

The GbAgg 730 node, along with the two MIN nodes 770 and 775 select from scalar subtrees 780 and 785 according to the IFF statements in IFF nodes 781 and 786. As can be seen from FIG. 6, the selection corresponds to the predicates in the replaced subtrees. The selection can also be done by means of other operators which perform selection, such as CASE. This creates the pivot step which separates the data which would previously have been retrieved by a subtree, now replaced, from the rest of the data retrieved at select node 740. Additionally, the pivot step provides the data in the correct column form.

After the optimization described, where scalar subtrees are replaced, additional optimization (including additional replacement of scalar subtrees) may be performed.

Figure 7:
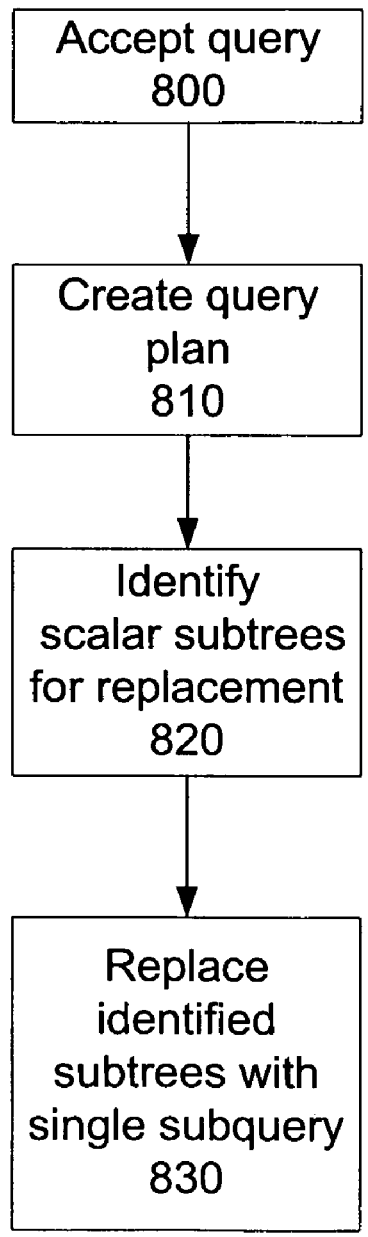
FIG. 7 is a flow diagram illustrating the operation of a database front end according to some embodiments of the invention.

A database front end, therefore, may function as shown in the flow diagram in FIG. 7 according to some embodiments of the invention. As shown in FIG. 7, in a first step 800, a query is accepted. In a second step 810, a naïve query plan is created from the query. Then, as described above, two or more subqueries of the naïve query plan are identified, each of which directed towards the same data set in the database, step 820. The subqueries are replaced in step 830 with a new subquery which queries the data set for data for all replaced data sets.

Figure 8:
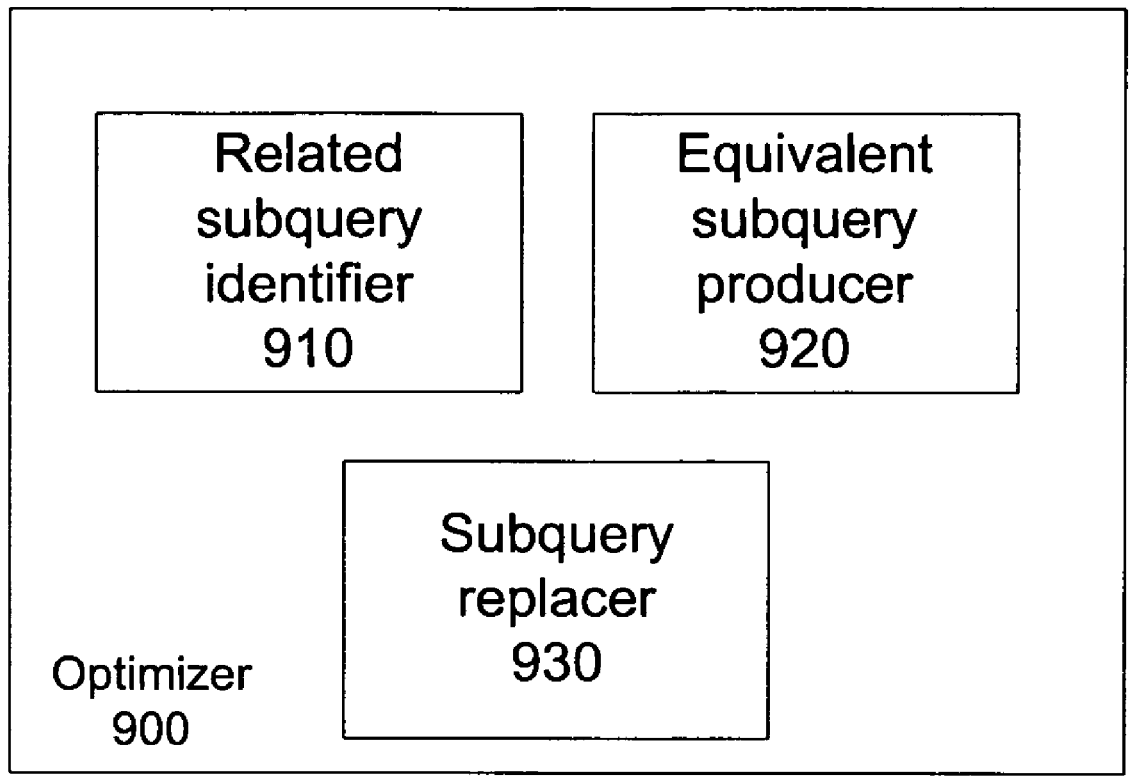
FIG. 8 is a block diagram showing an optimizer according to one embodiment of the invention.

FIG. 8 is a block diagram showing an optimizer according to one embodiment of the invention. As shown in FIG. 8, the optimizer 900 includes a related subquery identifier 910 which, given a query plan, identifies subqueries in the plan for replacement as described above. An equivalent subquery producer 920 produces a new subquery to use in replacing the two query plans. A subquery replacer 930 is then used with the original query plan and the new subquery to produce a new query plan using the new subquery.

Exemplary Computer System and Implementation

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 9:
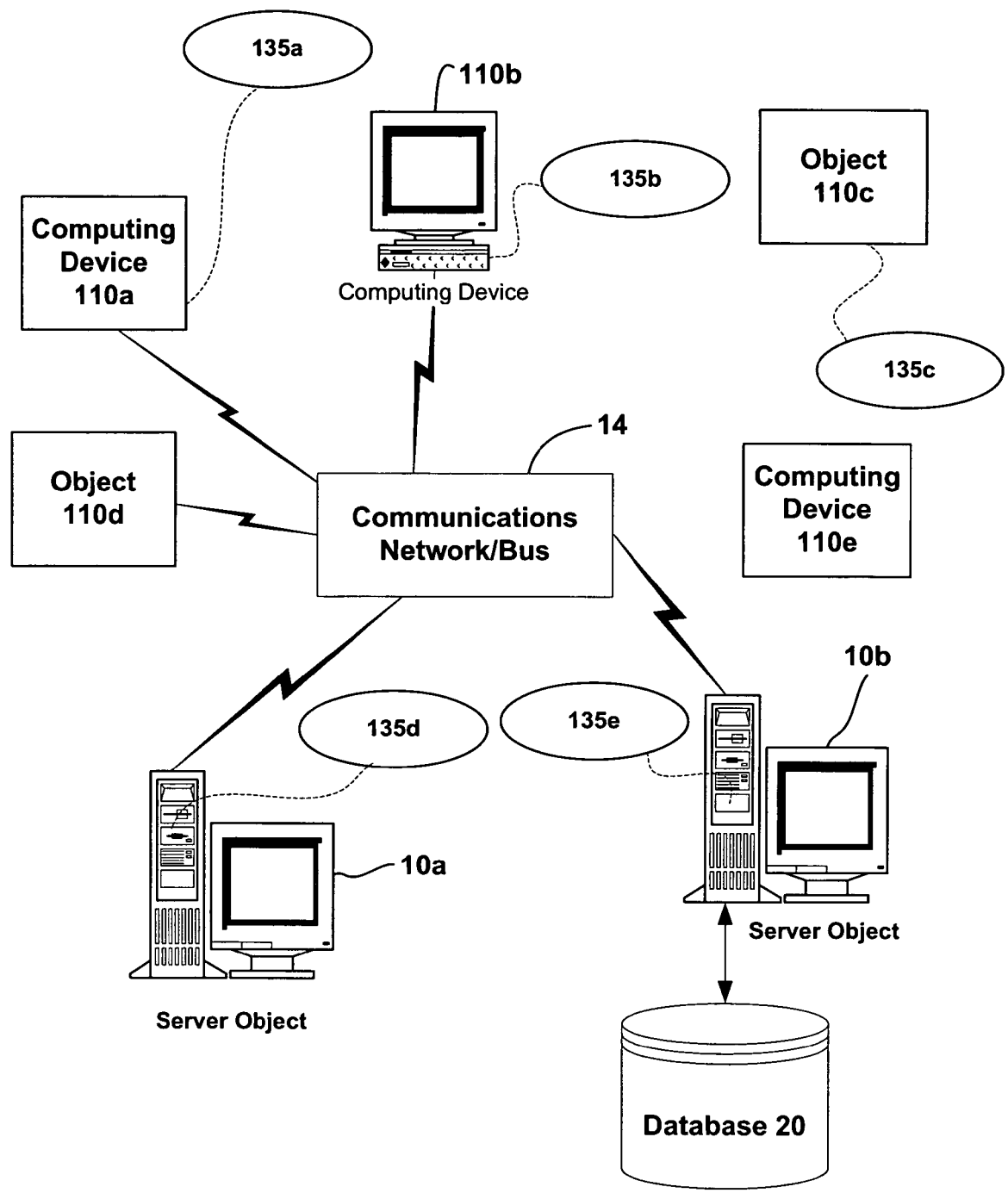
FIG. 9 is a block diagram representing an exemplary network environment having a variety of computing devices in which the present invention may be implemented.

FIG. 9 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 9, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 9 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 9 and the following discussion are intended to provide a brief general description of a suitable computing device in connection with which the invention may be implemented. For example, any of the client and server computers or devices illustrated in FIG. 9 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 10:
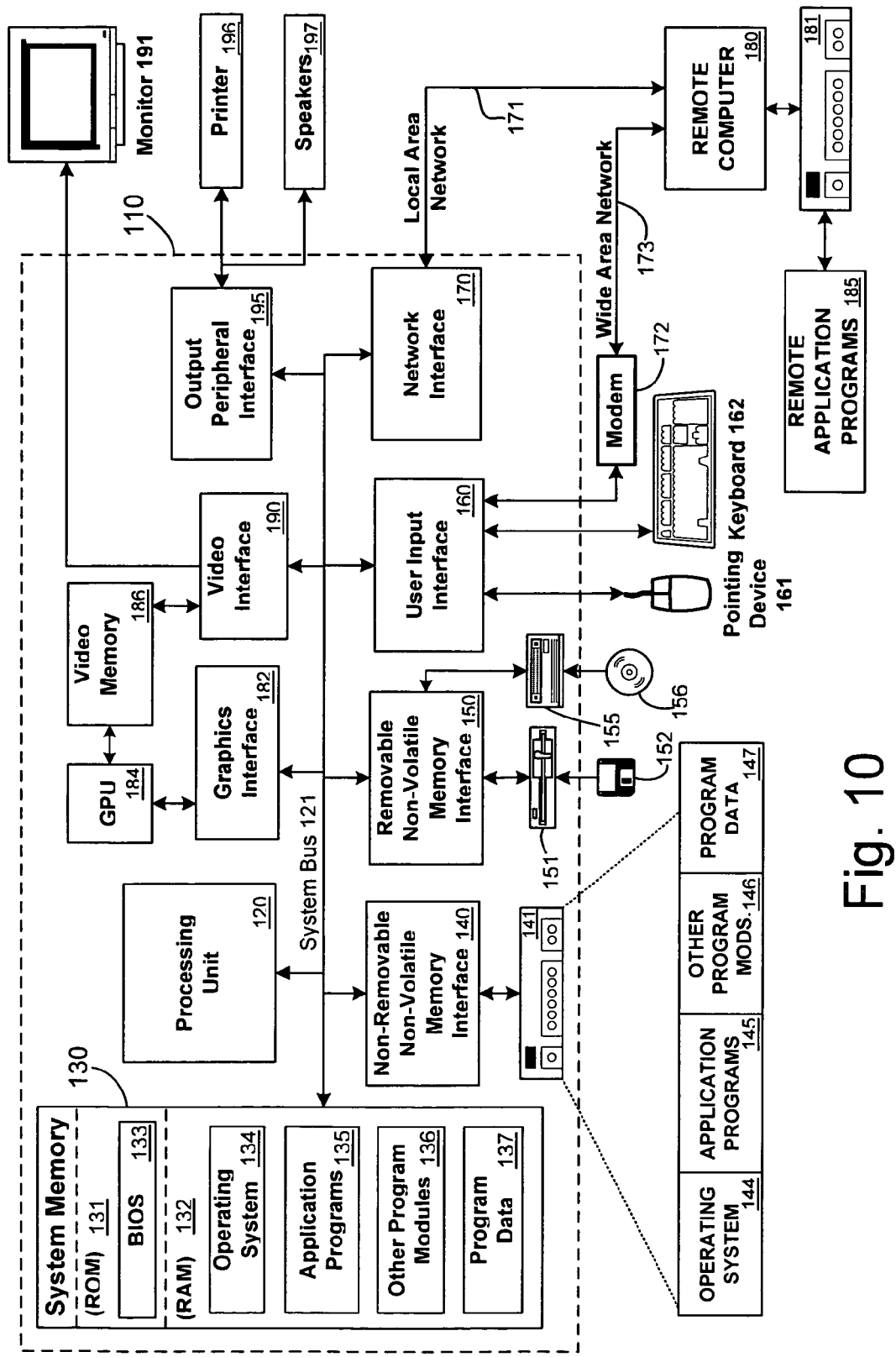
FIG. 10 is a block diagram representing an exemplary computing device in which the present invention may be implemented.

FIG. 10 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

CONCLUSION

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A computer-implemented method to optimize a query plan, the method comprising:

receiving a query for processing by a database application that is executed by a hardware processor system of a computer system to perform acts for processing the query and retrieving data from a computer readable storage medium, wherein processing the query comprises acts of:

creating a query plan from said query, the query plan comprising a plurality of subqueries;

identifying at least two subqueries of said query plan that are directed towards a same data set, the at least two subqueries comprising a first subquery that requests first data from said data set, and a second subquery that requests second data from said data set;

generating a new subquery that comprises a predicate that is a disjunction of all predicates of the first and second subquery in the query plan, wherein direction toward the same data set is the sole requirement to generating the new subquery; and replacing said first and second subqueries in said query plan with the new subquery for querying the data set for both said first data and said second data so that the data set is accessed only once for all identified subqueries.

2. The method of claim 1, where said new subquery comprises a single select statement, and wherein the predicate of the new subquery comprises a disjunction of a first predicate of a first select statement associated with the first subquery and a second predicate of a second select statement associated with the second subquery.

3. The method of claim 1, where said querying of said data set for both first data and said second data results in first tabular data, said first tabular data comprising a first set of rows containing said first data results and a second set of rows containing said second data results, and where said new subquery comprises a pivoting step transforming said first tabular data.

4. The method of claim 3, where said pivoting step results in second tabular data, said second tabular data comprising a first set of at least one column containing first data results and a second set of at least one column containing said second data results.

5. The method of claim 3, where said pivoting step is performed by means of a selection operator.

6. The method of claim 1, where, after said step of replacing said subqueries in a query plan said query plan is further optimized.

7. The method of claim 1, where said data set comprises data in extensible markup language form.

8. The method of claim 1, where each of said subqueries is a scalar subquery.

9. A computer-readable storage medium comprising computer-executable instructions that are executable by a computer to perform a method to retrieve data from a database, said method comprising:

accepting a query;

creating a query plan from said query, the query plan comprising a plurality of subqueries;

identifying at least two subqueries of said query plan that are directed towards a same data set in said database, the at least two subqueries comprising a first subquery that requests a first property from said data set, and a second subquery that requests a second property from said data set;

generating a new subquery that comprises a predicate that is a disjunction of all predicates of the first and second subquery in the query plan, wherein direction toward the same data set is the sole requirement to generating the new subquery; and replacing said first and second subqueries in said query plan with the new subquery for querying the data set for both said first property and said second property so that the data set is accessed only once for all identified subqueries.

10. The computer-readable storage medium of claim 9, where said new subquery comprises a single select statement, and wherein the predicate of the new subquery comprises a disjunction of a first predicate of a first select statement associated with the first subquery and a second predicate of a second select statement associated with the second subquery.

11. The computer-readable storage medium of claim 9, where said querying of said data set for both said first property and said second property results in first tabular data, said first tabular data comprising a first set of rows containing said first property results and a second set of rows containing said second property results, and where said new subquery comprises a pivoting step transforming said first tabular data.

12. The computer-readable storage medium of claim 11, where said pivoting step results in second tabular data, said second tabular data comprising a first set of at least one column containing first property results and a second set of at least one column containing said second property results.

13. The computer-readable storage medium of claim 11, where said pivoting step is performed by means of a selection operator.

14. The computer-readable storage medium of claim 9, where said data set comprises data in extensible markup language form.

15. A computer system comprising:

a processing unit; and system memory that stores an application program that is executed by the processing unit to optimize a query plan, the application program comprising:

a related subquery identifier module to identify identifying at least two subqueries of said query plan that are directed towards a same data set, the at least two subqueries comprising a first subquery that requests first data from said data set, and a second subquery that requests second data from said data set;

an equivalent subquery producer module to produce a new subquery that comprises a predicate that is a disjunction of all predicates of the first and second subquery in the query plan wherein direction toward the same data set is the sole requirement to producing the new subquery; and a subquery replacer to produce a new query plan by replacing said first and second subqueries of said query plan with said new subquery for querying the data set for both said first data and said second data so that the data set is accessed only once for all identified subqueries.

16. The computer system of claim 15, where said new subquery comprises a single select statement, and wherein the predicate of the new subquery comprises a disjunction of a first predicate of a first select statement associated with the first subquery and a second predicate of a second select statement associated with the second subquery.

17. The computer system of claim 15, where said querying of said data set for both first data and said second data results in first tabular data, said first tabular data comprising a first set of rows containing said first data results and a second set of rows containing said second data results, and where said new subquery comprises a pivoting step transforming said first tabular data.

18. The computer system of claim 17, where said pivoting step results in second tabular data, said second tabular data comprising a first set of at least one column containing first data results and a second set of at least one column containing said second data results.

19. The computer system of claim 17, where said pivoting step is performed by means of a selection operator.

20. The computer system of claim 15, where said data set comprises data in extensible markup language form.

* * * * *